United States Patent [19]

Moses et al.

[11] Patent Number: 4,937,154
[45] Date of Patent: Jun. 26, 1990

[54] ELECTROCHEMICAL CELL

[75] Inventors: Peter R. Moses, Windham, N.H.; Fred J. Berkowitz, Littleton; Alwyn H. Taylor, Wellesley Hills, both of Mass.

[73] Assignee: Duracell Inc., Bethel, Conn.

[21] Appl. No.: 271,793

[22] Filed: Nov. 16, 1988

[51] Int. Cl.⁵ .............................................. H01M 10/02
[52] U.S. Cl. .......................................... 429/94; 429/194
[58] Field of Search ...................................... 429/94, 194

[56] References Cited

U.S. PATENT DOCUMENTS 4,385,101  5/1983  Catanzarite ............................ 429/94
4,482,615  11/1984  Rosansky et al. ..................... 429/94
4,622,277  11/1986  Bedder et al. ......................... 429/94

Primary Examiner—Donald L. Walton
Attorney, Agent, or Firm—Ronald S. Cornell; James B. McVeigh

[57] ABSTRACT

This invention relates to an electrochemical cell having spirally wound electrodes and an electrolyte which enhances plating of the anode metal during voltage reversal. The safety of such cells is improved by concentrating the current, during voltage reversal, between an outer segment of the anode and a metal sheet connected to the cathode whereby anode metal plates only onto the metal sheet. Thus, the hazardous condition of plating anode metal onto the cathode is avoided.

25 Claims, 2 Drawing Sheets

ELECTROCHEMICAL CELL

This invention relates to an electrochemical cell having a spirally wound electrode stack and an electrolyte which enhances plating of the anode metal during voltage reversal. The safety of such cells is improved by concentrating the current, during voltage reversal, between a segment of the anode and a metal sheet connected to the cathode whereby anode metal plates primarily onto the metal sheet. Thus, the hazardous condition of plating anode metal onto the cathode is avoided.

Consumers often inadvertently place fresh cells in series with partially discharged cells in battery operated devices. Voltage reversal of the partially discharged cells occurs when these cells have exhausted their capacity but continue to be forced discharged by the fresh cells. High energy density electrochemical cells, such as lithium cells, have become widely available for consumer use during the past decade. During voltage reversal of lithium cells a deposit of lithium can form on the cathode. Occasionally the deposit can grow to sufficient size to bridge the gap between the electrodes and short circuit the cell.

The morphology of the lithium deposit is highly dependent on the components of the electrolyte, i.e. the electrolyte salt and solvents. Salts commonly used in primary lithium cells include $LiCF_3SO_3$, $LiAsF_6$, $LiBF_4$, $LiPF_6$, and $LiClO_4$. Each of these salts has a different effect on the morphology of plated lithium. It is also true that the solvents used in the electrolyte will effect the morphology and, in fact, a reactive solvent present in sufficient amount will have a leveling effect and mask the differences among the salts. However, commonly used electrolyte formulations employ solvent combinations which are not highly reactive, e.g. propylene carbonate and dimethoxyethane in a 1/1 volume ratio. Thus, for a given non-reactive solvent formulation, it has been found that, of the above listed salts, $LiClO_4$ enhances the lithium plating process such that a coherent, metallic deposit is formed on the cathode, which deposit is more plate-like than dendritic. The result of having a plate-like deposit is to create intimate contact between the plated lithium and the cathode. If a short circuit occurs between the anode and the cathode during voltage reversal, the intimate mixture of lithium on the cathode is heated and this heating can cause the mixture to react violently. In addition to $LiClO_4$, $LiAsF_6$ and $LiPF_6$ are also salts which enhance the formation of a coherent, metallic lithium deposit.

Various designs have been used by manufacturers to protect a cell from hazardous conditions during voltage reversal. U.S. Pat. Nos. 4,385,101, 4,482,615, and 4,622,277 disclose a variety of approaches to improve the safety of spirally wound lithium cells during voltage reversal. While these patents disclose effective expedients for safety when dendritic deposits are formed, they are not as effective for providing safety when plate-like deposits form.

The present invention is discussed more fully below with reference to the FIGS. in which.

The present invention relates to spirally wound lithium cells wherein the electrolyte comprises a salt, such as $LiClO_4$, which, when used, results in the formation of plate-like deposits of lithium during voltage reversal. Generally, such cells comprise an anode, a cathode, and a separator spirally wound together such that said separator is between said anode and cathode. According to the present invention an anode tab is located on a section of the anode which is not fully utilized during discharge. An electrically conductive member is located across from the face of said anode section which does not bear said tab. Said member is electrically coupled to the cathode, such as by physical contact, and is insulated from said anode section by said separator. During voltage reversal anode metal is preferentially plated onto said sheet.

Figure 1:
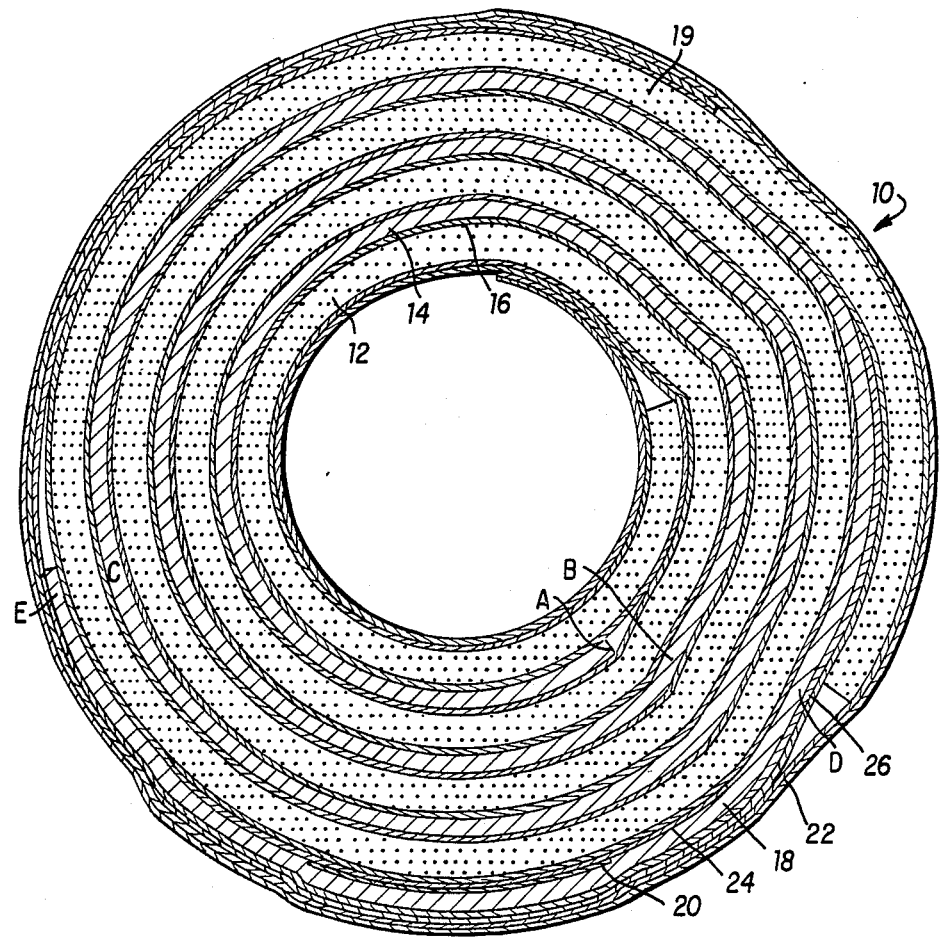
FIG. 1 shows a schematic cross section through a spirally wound electrode stack made in accordance with the present invention.

With specific reference to the FIGS., FIG. 1 shows a cross section through a spirally wound electrode stack 10 wherein the cathode 12 is longer than the anode 14. The relative lengths of the anode 14 and cathode 12 are such that, when these electrodes are spirally wound together having separator 16 located therebetween, only the outermost segment of anode 14 (designated 18 and extending from D to E) forms a part of the outer circumference of the electrode stack, as shown in FIG. 1. The remainder of the circumference of the electrode stack is formed by an outermost segment of cathode 14 (designated 19), whereby the outermost segment of anode is shorter than the outermost segment of cathode. A metal tab 20 is attached to the inner surface of anode segment 18. This tab functions as the electrical contact between the anode and the negative terminal of the cell. In accordance with the present invention, an electrically conductive member 22 is located along the circumference of the spirally wound electrode stack such that the member is in mechanical and electrical contact with cathode outer segment 19. It is important that a section of separator 16 is located between segment 18 of the anode and member 22, as shown, to prevent a short circuit therebetween. An insulating means 24, discussed more fully below, is located between the inner surface of anode segment 18 and the adjacent cathode surface. The function of means 24 is to provide an ion impermeable or high resistance barrier between anode segment 18 and the adjacent cathode so that the anode metal cannot plate onto that section of cathode. As discussed more fully below, during forced discharge or voltage reversal, a deposit of plate-like lithium preferentially forms on the surface of member 22 facing anode segment 18. Should a short circuit occur because such plate-like deposit contacts anode segment 18, the short circuit safely shunts the forced discharge current through the cell without causing large negative voltages in the reversed cell.

In order to ensure the effectiveness of the present invention it is preferred that anode tab 20 and member 22 are associated with a segment of the anode which is not fully utilized during discharge. The "extra" amount of anode material is needed in order to effectively create a short circuit between member 22 and the anode segment opposite thereto. While extra anode material is required, it is preferred that the outer segment 18 not exceed about 10% of the total anode length. Anode material in excess of this amount is not needed to create a short circuit and thus would occupy space in the cell which could otherwise be occupied by cathode material which would be utilized during discharge.

Referring again to FIG. 1, the anode 14 can be described as comprising four consecutive regions (A-B, B-C, C-D, D-E) which differ from each other by the rate at which they are consumed during discharge. The rate at which these regions are discharged is related to the amount of cathode material which "sandwiches" these regions of anode. The discharge rate in turn determines the amount of anode material which is utilized. Beginning at the inner end, A, of the anode 14, and moving outwardly along the anode length, the first region is defined by the length A-B. This length of anode has a segment of cathode across from its inner surface which cathode segment does not have any anode juxtaposed with its other side. Thus, the cathode material in this segment is discharged only by the anode segment A-B. The rate at which anode segment A-B is consumed is greater than the rate of discharge in the next anode length B-C because anode length B-C is sandwiched on both sides by a cathode segment which itself has anode on both sides. Thus, the anode length B-C discharges less cathode material per unit length than the length A-B and as a result length B-C is consumed at a lower rate during discharge.

The next anode length moving outwardly along the anode spiral is C-D. This length has similar discharge characteristics as length A-B since this length has an adjacent cathode segment which does not have anode on both sides. Thus, anode length C-D is discharged at a higher rate than length B-C and will be consumed before length B-C during discharge. The fourth anode length is D-E (also designated as anode segment 18). This length is discharged at the lowest rate of the four regions because D-E has cathode across from only the inner surface. Therefore, anode length D-E is consumed at the slowest rate during discharge.

The four anode regions will be consumed in the following order during discharge. Regions A-B and C-D are consumed first because they are discharged at the highest rate. Region B-C is discharged at an intermediate rate and is consumed to a lesser degree than A-B or C-D. Region D-E is consumed the least of all four regions because it is discharged at the slowest rate.

The location of anode tab 20 can be on either segment B-C or D-E, which sections have sufficient lithium remaining at the end of discharge to create a short circuit. However, with the specific design shown in FIG. 1 it is preferred to locate tab 20 on section D-E because this section has the greater amount of lithium remaining at the end of discharge. The end of discharge is reached as the cell is forced discharged when section C-D is virtually consumed and section B-C becomes electrically disconnected from region D-E where the tab is located. At this point section D-E cannot sustain a positive voltage at a high current density and voltage reversal occurs.

The present invention operates in conjunction with the above described phenomena as follows with reference to FIG. 1. In a preferred embodiment a conductive member 22, comprising a metal foil is located along the circumference of the spirally wound electrode stack such that the metal foil is in contact with the cathode. The metal foil 22 also extends over the entire outer surface of anode segment 18 and slightly beyond the outer edge thereof. It is necessary that the metal foil 22 be held at the cathode potential in order that lithium will plate thereto during voltage reversal should such occur. Should such a cell be force discharged beyond its capacity the only lithium connected to tab 20 would, for the reasons set forth above, be segment 18. If the cell is forced into voltage reversal lithium will begin to form plate-like deposits on that portion of metal foil 22 which is across from anode segment 18. As discussed below, insulating means 24 prevents lithium from plating in the opposite direction onto the cathode such that lithium can only plate onto the metal foil 22. If this deposit grows to sufficient thickness to contact anode segment 18 a short circuit occurs. This short circuit safely shunts the forced discharge current through the cell without causing any hazardous conditions which could otherwise occur.

In a preferred embodiment insulating means 24 is a piece of ion impermeable tape having a polyester backing and an acrylate adhesive. The adhesive can be omitted whereby the polyester film is held in place by pressure between the electrodes. However, the use of an adhesive simplifies the manufacture by holding the film in place until the electrode stack is fully wound. The dimensions of the tape should be such so as to cover a substantial portion of surface of anode segment 18 which faces the cathode. Unexpectedly, it has been discovered that means 24 does not need to cover the entire inner surface of anode segment 18, however means 24 should cover at least about 66%, and preferably at least about 80% of the inner surface of said anode segment. Thus, when the cell is driven into voltage reversal the lithium cannot plate through the ion impermeable tape to the cathode. It is thereby ensured that lithium will plate onto the metal foil 22. In another embodiment means 24 is a piece of material, such as a non-woven polypropylene mat having a greater weight density per unit length than the separator 16. The greater weight density per unit length will insure that means 24 is a more resistive to plate lithium through than the separator 16. The greater resistance will ensure that lithium will preferentially plate through the lower resistance pathway to the metal foil 22.

According to the present invention, conductive member 22 and insulating means 24 are essential even when insulating means 24 covers the entire inner surface of anode segment 18. In this latter situation, one might expect that lithium would be totally blocked from plating to the cathode and that conductive member 22 would not be necessary. However, plating of lithium onto the cathode would still occur because current passes through the lithium at the edge of the tape. When metal foil 22 is present, it acts as a counter electrode and lithium preferably plates thereto.

With the spirally wound cell design shown in FIG. 1, it is desirable to include a cathode edge protector 26. Edge protector 26 is placed between the outermost edge of cathode 12 and the lithium anode 14 lying immediately behind the cathode edge in order to protect against sharp points on the edge of the cathode from piercing through separator 16 and causing a short to anode 14. In order for the present invention to operate properly, protector 26 should be made from a highly porous material so that plating to metal foil 22 is not hampered. Suitable materials include non-woven fabrics made from polyolefins such as polypropylene or polyethylene. Polypropylene is the preferred material.

The features and advantages of the present invention are demonstrated in the following examples.

COMPARATIVE EXAMPLE A

Four ⅔A size lithium/manganese dioxide cells are built having a lithium foil anode, a manganese dioxide cathode, and a microporous polypropylene separator spirally wound together with the separator between the anode and cathode. The lithium anode is 8.7 inches long, 0.9 inch wide, and 0.007 inch thick. The manganese dioxide cathode is 9.3 inches long, 1 inch wide, and 0.015 inch thick. The anode and cathode are spirally wound together with a 1 mil microporous polypropylene separator therebetween such that about 0.6 inch of anode lies along the outer circumference of the spirally wound electrode stack. A metal anode tab comprising nickel is located on the inner surface of this outer segment of anode. A piece of adhesive tape comprising a Mylar backing and an acrylate adhesive and about 0.4 inches long is applied over the metal anode tab onto the lithium surface. The cells are filled with an electrolyte comprising 0.65 molar $LiClO_4$ in a mixture of propylene carbonate and dioxolane. Each cell has an open circuit voltage of about 3.2V and has a capacity of about 1.4 A-Hr to a 2 volt cutoff under a 100 ohm load.

Figure 2:
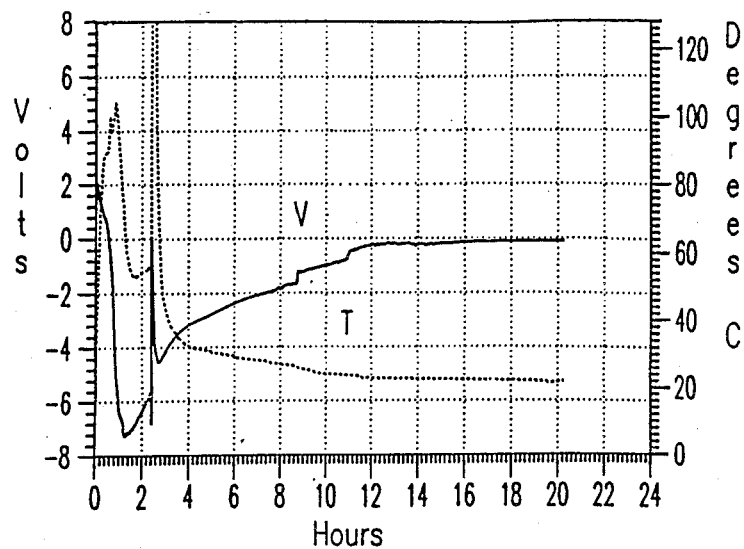
FIG. 2 shows the temperature and voltage of a prior art cell during voltage reversal.

One of the cells is discharged by about 40% of its original capacity. This cell is then connected in series with the other three undischarged cells. This arrangement simulates the situation where a consumer connects a partially discharged cell with fresh cells. A 6 ohm resistor is used to discharge the four cells connected in series. FIG. 2 shows the voltage and temperature characteristics of the partially discharged cell. The figure shows that within the first hour the voltage of the partially discharged cell is driven below zero volts. Lithium plates onto the cathode as long as the cell voltage remains below zero. After about one hour the cell temperature reaches a peak and begins to fall because the current being supplied by the three "driver" cells begins to fall. Slightly after two hours a short circuit occurs, said short being caused by plated lithium which makes contact between the anode and cathode. The short is evidenced by the voltage of the cell falling to zero. A current surge results from the short and causes tremendous heating. The cell temperature goes off scale in the FIG. but is measured to be about 442° C. This temperature is the result of hazardous reactions between the chemicals in the cell causing thermal runaway thereof.

EXAMPLE 1

Three ⅔A size lithium/manganese dioxide cells are built identically to the above described cells.

A fourth cell is built identically except that, in accordance with the present invention, a piece if aluminum foil 1 inch wide and 1 mil thick is wrapped around the circumference of the spirally wound electrodes. The aluminum foil is held apart from contacting the outer anode segment by the separator. A wrapping of separator holds the foil in place prior to insertion into the cell can. This cell is discharged to 50% of its original capacity and is then connected in series with the three undischarged cells.

Figure 3:
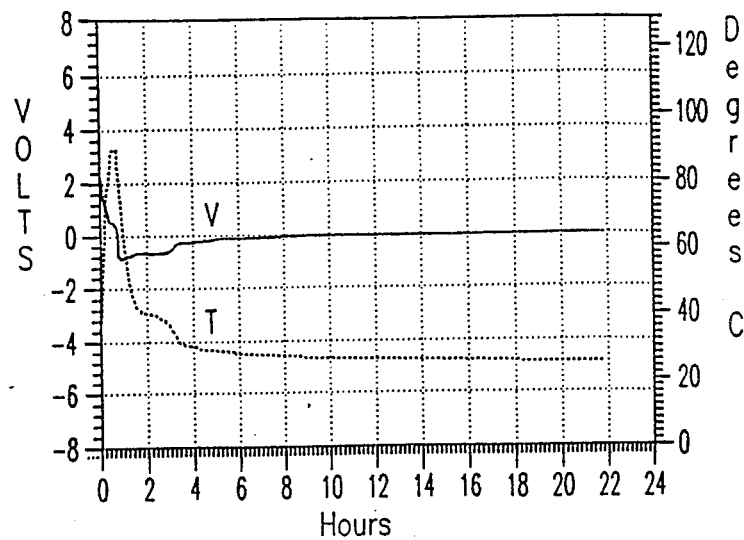
FIG. 3 shows the temperature and voltage of a cell made in accordance with the present invention during voltage reversal.

The four cells are then discharged through a 6 ohm resistor. FIG. 3 shows the temperature and voltage characteristics of the cell made in accordance with the present invention. The cell temperature rises to about 95° C. but the cell voltage is not driven to large negative values as in the previous example. Rather, the voltage does not go below about −1 volt. The current is safely shunted through the cell by the plate-like lithium deposit on the metal foil as described above.

While the above example described the metal foil as extending along the entire circumference of the spirally wound electrode stack, the length of the metal foil could be less. The minimum length is that length which would both cover the outer anode segment and contact a sufficient length of cathode to ensure good electrical contact between the foil and the cathode. It is preferred that the metal foil extend from between about 50% to 100% of the circumference of the spirally wound electrodes.

The metal foil is preferably aluminum, but it can be comprised of metals other than aluminum. The only requirement of the metal is that it be compatible with the cell environment. Other suitable metals include titanium, tantalum, niobium, stainless steel, nickel, and those metals which can alloy with lithium such as aluminum.

The metal foil should be sufficiently thick so that it can be handled easily. However, it should not be so thick as to occupy space which could otherwise be occupied by active materials. It is preferred the foil thickness be between about 0.5 and 5 mils.

Figure 4:
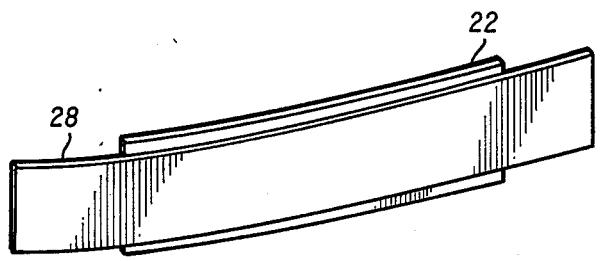
FIG. 4 shows an embodiment of a conductive member laminated with adhesive tape in accordance with the present invention.

In addition to using a metal foil, it could be desirable to use a laminate of a metal foil and an adhesive tape, as shown in FIG. 4. In such case, the laminate should have an adhesive tape layer 28 which extends beyond the metal foil layer 22 so that the adhesive can be used to hold the foil in place. The foil thickness can be very thin (i.e. less than 0.5 mil) if a laminate is used because the tape backing provides the needed mechanical strength. Both the tape backing and the adhesive must, of course, be compatible with the cell environment.

The above examples described the use of an insulating means comprised of an adhesive tape having a Mylar backing and an acrylate adhesive. Other suitable backings include polyester, vinyl, cellophane, ultra high molecular weight polyethylene, and ultra high molecular weight polypropylene. Other suitable adhesives include silicone and rubber based adhesives.

An alternative to the design described in the examples would be to have the anode tab and metal foil arrangement located inside the electrode stack and associated with the section of the anode corresponding to section B-C in FIG. 2. The actual location of the anode tab and the metal foil will depend on the particular configuration of the spirally wound electrodes. For a given configuration, the location of the anode tab should be on a section of the anode which remains at the end of discharge. The metal foil, electrically coupled to the cathode, is then placed opposite to said section of anode in the manner described above.

In the most commonly used spirally wound cell designs the cell can functions as the negative terminal, i.e. "can negative" and the cell cover functions as the positive terminal. Connection of the electrodes to the terminals is achieved by a variety of methods well known in the art. With the "can negative" design the outer surface of the cathode and the metal foil must be covered by a layer or layers of separator to prevent short circuit to the cell can which is connected to the anode. However, if a cell design had the cell can as the positive terminal, i.e. "can positive", and the cell top as the negative terminal it would not be necessary to interpose separator between the cathode and the cell can. In this embodiment the cell can would function as the metal foil in the "can negative" design and a separate piece of metal foil would not be necessary. During voltage reversal lithium would plate from the outer segment of the anode to the cell can and the same result would be achieved as with the metal foil in the "can negative" design.

As previously noted, the present invention is most effective in cells having electrolytes comprising salts which give rise to a plate-like deposit of lithium. While the above description has referred specifically to electrolytes containing LiClO$_4$, other salts which give plate-like deposits such as LiAsF$_6$ and LiPF$_6$ are useful in accordance with the present invention.

The specific example described the presently disclosed invention as used in a lithium/manganese dioxide cell. However, the invention is broadly useful in conjunction with any solid cathode. Classes of suitable cathodes include metal oxides, carbon fluorides, metal sulfides, transition metal polysulfides, metal halides such as CF$_x$, V$_2$O$_5$, WO$_3$, MoO$_3$, MoS$_2$, lead oxides, cobalt oxides, copper oxides, CuS, CuS$_2$, iron sulfides, NiS, Ag$_2$CrO$_4$, Ag$_3$PO$_4$, TiS$_2$, and mixtures thereof. The present invention could also be used in cells having anodes other than lithium. Suitable anode materials include alkali and alkaline earth metals such as lithium, sodium, potassium, calcium, magnesium, aluminum and alloys thereof.

The previous examples are intended to be illustrative of the presently disclosed invention. It is to be understood that deviations can be made but still remain within the scope of the presently disclosed invention.

What is claimed is:

1. An electrochemical cell having a spirally wound electrode stack comprising an anode, a cathode, and a separator spirally wound together with the separator positioned between said anode and cathode, whereby an outer segment of the anode lies along the outer circumference of the electrode stack and the remainder of the circumference comprises an outer segment of the cathode, wherein said outer anode segment comprises no more than 10% of the total anode length; an anode tab attached to the inner surface of the outer segment of anode; an electrolyte; an electrically conductive member in mechanical and electrical contact with the outer cathode segment, wherein said member extends over said outer anode segment and beyond the outer edge thereof; and an insulating means located along the inner surface of the outer anode segment which means is a barrier to ion migration; whereby, during voltage reversal, anode metal is preferentially plated from the outer surface of the outer anode segment to the conductive member juxtaposed thereto.

2. The cell of claim 1 wherein the conductive member consists essentially of a metal foil.

3. The cell of claim 1 wherein the conductive member comprises a strip of metal foil having adhesive tape extending beyond opposite ends thereof such that the metal foil is held in place by the adhesive tape.

4. The cell of claim 1 wherein the spirally wound electrodes are contained within a cylindrical metal casing and said conductive member comprises said metal casing.

5. The cell of claim 1 wherein the anode is selected from the group consisting of alkali, alkaline earth, and earth metals and mixtures and alloys thereof.

6. The cell of claim 1 wherein the anode comprises lithium.

7. The cell of claim 6 wherein the electrolyte comprises an electrolyte salt selected from the group consisting of LiClO$_4$ and LiAsF$_6$.

8. The cell of claim 3 wherein the metal foil is made from a metal selected from the group consisting of titanium, tantalum, niobium, stainless steel, nickel, and metals which can alloy with lithium.

9. The cell of claim 8 wherein the insulating means covers at least 66% of the inner surface of said outer anode segment and said insulating means comprises an adhesive tape having a backing selected from the group consisting of polyester, vinyl, cellophane, ultra high molecular weight polyethylene, and ultra high molecular weight polypropylene and an adhesive selected from the group consisting of acrylate, silicone, and rubber based adhesives.

10. The cell of claim 8 wherein the insulating means comprises a non-woven material having a greater weight density than the separator.

11. An electrochemical cell having a spirally wound electrode stack comprising an anode strip comprised of an anode active metal foil, a cathode strip, and a separator, wherein the cathode strip is longer than the anode strip whereby, when spirally wound together with said separator therebetween, an outermost segment of the anode is shorter than an outermost segment of the cathode; a non-aqueous electrolyte; a metal anode tab connected to the inner surface of said outermost anode segment; an insulating sheet covering at least about 66% of the inner surface of the outermost anode segment including said anode tab attached thereto; and a conductive sheet comprising a metal foil wherein the foil is in electrical and mechanical contact with said outer cathode segment and said foil extends over the outer surface of the outer anode segment.

12. The cell of claim 11 wherein said anode active metal foil comprises lithium.

13. The cell of claim 12 wherein said electrolyte comprises LiClO$_4$.

14. The cell of claim 13 wherein said conductive sheet consists essentially of a metal foil selected from the group consisting of titanium, tantalum, niobium, stainless steel, nickel, and those metals which can alloy with lithium such as aluminum.

15. The cell of claim 13 wherein said conductive sheet further comprises adhesive tape extending from opposite ends thereof whereby said tape holds said metal foil in position.

16. The cell of claim 15 wherein said adhesive tape comprises a backing selected from the group consisting of polyester, vinyl, cellophane, ultra high molecular weight polyethylene, and ultra high molecular weight polypropylene and an adhesive selected from the group consisting of acrylate, silicone, and rubber based adhesives.

17. The cell of claim 16 wherein said metal foil has a length between about 50–100% of the circumference of the spirally wound electrode stack.

18. The cell of claim 17 wherein said metal foil has a thickness from between about 0.5 and 5 mils.

19. The cell of claim 16 wherein said insulating sheet consists essentially of an adhesive tape wherein said tape comprises a backing selected from the group consisting of polyester, vinyl, cellophane, ultra high molecular weight polyethylene, and ultra high molecular weight polypropylene and an adhesive selected from the group consisting of acrylate, silicone, and rubber based adhesives.

20. The cell of claim 16 wherein said insulating sheet comprises a non-woven polyolefin fabric having a weight density greater than the weight density of the separator.

21. The cell of claim 19 wherein said cathode comprises a cathode active material selected from the group consisting of metal oxides, carbon fluorides, metal sulfides, transition metal polysulfides, metal halides such as $MnO_2CFx$, $V_2O_5$, $WO_3$, $MoO_3$, $MoS_2$, lead oxides, cobalt oxides, copper oxides, $CuS$, $CuS_2$, $In_2O_3$, iron sulfides, $NiS$, $Ag_2CrO_4$, $Ag_3PO_4$, $TiS_2$, and mixtures thereof.

22. An electrochemical cell comprising an anode, a cathode, and a separator spirally wound together such that the separator is between said anode and cathode; an electrolyte comprising $LiClO_4$; an anode tab attached to a section of the anode which is not fully consumed during discharge; and an electrically conductive sheet coupled to the cathode, said sheet being disposed across from the face of said anode section which does not have said tab connected thereto and said sheet being insulated from said anode face by said separator, whereby during voltage reversal anode metal is preferentially plated from the anode section to the sheet juxtaposed thereto.

23. The cell of claim 22 wherein said sheet consists essentially of a metal foil.

24. The cell of claim 23 further comprising an insulating means located along the face of the anode section having said tab connected thereto.

25. The cell of claim 24 wherein said anode comprises lithium and said metal foil comprises aluminum.

* * * * *